(12) United States Patent
Fudemoto et al.

(10) Patent No.: US 7,572,855 B2
(45) Date of Patent: *Aug. 11, 2009

(54) NANO-COMPOSITE AND COMPOSITIONS MANUFACTURED THEREOF

(75) Inventors: Hiroyuki Fudemoto, Kodaira (JP); Xiaorong Wang, Hudson, OH (US); Victor J. Foltz, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 564 days.

This patent is subject to a terminal disclaimer.

(21) Appl. No.: 11/045,950

(22) Filed: Jan. 28, 2005

(65) Prior Publication Data

US 2006/0173115 A1 Aug. 3, 2006

(51) Int. Cl.
*C08K 5/09* (2006.01)
(52) U.S. Cl. ............... 524/445; 524/186; 524/447
(58) Field of Classification Search .......... 524/445, 524/446, 447, 449, 451, 448, 186
See application file for complete search history.

(56) References Cited

U.S. PATENT DOCUMENTS

| | | | |
|---|---|---|---|
| 2,493,318 A | 1/1950 | Shonle et al. | |
| 2,531,396 A | 11/1950 | Carter et al. | |
| 3,598,884 A | 8/1971 | Wei | |
| 3,972,963 A | 8/1976 | Schwab et al. | |
| 4,233,409 A | 11/1980 | Bulkley | |
| 4,247,434 A | 1/1981 | Lovelace et al. | |
| 4,326,008 A | 4/1982 | Rembaum | |
| 4,386,125 A | 5/1983 | Shiraki et al. | |
| 4,463,129 A | 7/1984 | Shinada et al. | |
| 4,543,403 A | 9/1985 | Isayama et al. | |
| 4,598,105 A * | 7/1986 | Weber et al. | 523/215 |
| 4,602,052 A * | 7/1986 | Weber et al. | 523/215 |
| 4,659,790 A | 4/1987 | Shimozato et al. | |
| 4,665,963 A | 5/1987 | Timar et al. | |
| 4,717,655 A | 1/1988 | Fluwyler | |
| 4,725,522 A | 2/1988 | Breton et al. | |
| 4,764,572 A | 8/1988 | Bean, Jr. | |
| 4,773,521 A | 9/1988 | Chen | |
| 4,774,189 A | 9/1988 | Schwartz | |
| 4,788,254 A | 11/1988 | Kawakubo et al. | |
| 4,829,130 A | 5/1989 | Licchelli et al. | |
| 4,829,135 A | 5/1989 | Gunesin et al. | |
| 4,837,274 A | 6/1989 | Kawakubo et al. | |
| 4,837,401 A | 6/1989 | Hirose et al. | |
| 4,861,131 A | 8/1989 | Bois et al. | |
| 4,870,144 A | 9/1989 | Noda et al. | |
| 4,871,814 A | 10/1989 | Gunesin et al. | |
| 4,904,730 A | 2/1990 | Moore et al. | |
| 4,904,732 A | 2/1990 | Iwahara et al. | |
| 4,906,695 A | 3/1990 | Blizzard et al. | |
| 4,920,160 A | 4/1990 | Chip et al. | |
| 4,942,209 A | 7/1990 | Gunesin | |
| 5,036,138 A | 7/1991 | Stamhuis et al. | |
| 5,066,729 A | 11/1991 | Stayer, Jr. et al. | |
| 5,073,498 A | 12/1991 | Schwartz et al. | |
| 5,075,377 A | 12/1991 | Kawabuchi et al. | |
| 5,100,947 A | 3/1992 | Puydak et al. | |
| 5,120,379 A | 6/1992 | Noda et al. | |
| 5,130,377 A | 7/1992 | Trepka et al. | |
| 5,162,445 A | 11/1992 | Powers et al. | |
| 5,169,914 A | 12/1992 | Kaszas et al. | |
| 5,178,702 A | 1/1993 | Frerking, Jr. et al. | |
| 5,194,300 A | 3/1993 | Cheung | |
| 5,219,945 A | 6/1993 | Dicker et al. | |
| 5,227,419 A | 7/1993 | Moczygemba et al. | |
| 5,237,015 A | 8/1993 | Urban | |
| 5,241,008 A | 8/1993 | Hall | |
| 5,247,021 A | 9/1993 | Fujisawa et al. | |
| 5,256,736 A | 10/1993 | Trepka et al. | |
| 5,262,502 A | 11/1993 | Fujisawa et al. | |
| 5,290,873 A | 3/1994 | Noda et al. | |
| 5,290,875 A | 3/1994 | Moczygemba et al. | |
| 5,290,878 A | 3/1994 | Yamamoto et al. | |
| 5,331,035 A | 7/1994 | Hall | |
| 5,336,712 A | 8/1994 | Austgen, Jr. et al. | |
| 5,395,891 A | 3/1995 | Obrecht et al. | |
| 5,395,902 A | 3/1995 | Hall | |
| 5,399,628 A | 3/1995 | Moczygemba et al. | |

(Continued)

FOREIGN PATENT DOCUMENTS

DE 3434983 4/1986

(Continued)

OTHER PUBLICATIONS

Wilkes, John .S. et al., "Dialkylimidazolium Chloroaluminate Melts: A New Class of Room-Temperature Ionic Liquids for Electrochemistry, Spectroscopy, and Synthesis", Inorg. Chem., 21, pp. 1263-1264 (1982).*

(Continued)

*Primary Examiner*—Katarzyna Wyrozebski
(74) *Attorney, Agent, or Firm*—Nathan Lewis; Meredith E. Hooker

(57) ABSTRACT

The present invention is directed to nano-composite and composition comprising a cationic mediator and method thereof. The cationic mediator is comprised of a hydrophobic unit and a heterocyclic cationic unit. The nano-composite is practically useful in formulating compositions such as rubber and tire products with improved gas permeability, cure properties, and/or mechanical properties etc.

11 Claims, 3 Drawing Sheets

U.S. PATENT DOCUMENTS

| | | |
|---|---|---|
| 5,399,629 A | 3/1995 | Coolbaugh et al. |
| 5,405,903 A | 4/1995 | Van Westrenen et al. |
| 5,421,866 A | 6/1995 | Stark-Kasley et al. |
| 5,436,298 A | 7/1995 | Moczygemba et al. |
| 5,438,103 A | 8/1995 | DePorter et al. |
| 5,447,990 A | 9/1995 | Noda et al. |
| 5,462,994 A | 10/1995 | Lo et al. |
| 5,514,734 A | 5/1996 | Maxfield et al. |
| 5,514,753 A | 5/1996 | Ozawa et al. |
| 5,521,309 A | 5/1996 | Antkowiak et al. |
| 5,525,639 A | 6/1996 | Keneko et al. |
| 5,527,870 A | 6/1996 | Maeda et al. |
| 5,530,052 A * | 6/1996 | Takekoshi et al. ............ 524/447 |
| 5,576,372 A | 11/1996 | Kresge et al. |
| 5,576,373 A | 11/1996 | Kresge et al. |
| 5,580,925 A | 12/1996 | Iwahara et al. |
| 5,587,423 A | 12/1996 | Brandstetter et al. |
| 5,594,072 A | 1/1997 | Handlin, Jr. et al. |
| 5,614,579 A | 3/1997 | Roggeman et al. |
| 5,627,252 A | 5/1997 | De La Croi Habimana |
| 5,665,183 A | 9/1997 | Kresge et al. |
| 5,688,856 A | 11/1997 | Austgen, Jr. et al. |
| 5,707,439 A * | 1/1998 | Takekoshi et al. ............ 106/483 |
| 5,728,791 A | 3/1998 | Tamai et al. |
| 5,733,975 A | 3/1998 | Aoyama et al. |
| 5,739,267 A | 4/1998 | Fujisawa et al. |
| 5,742,118 A | 4/1998 | Endo et al. |
| 5,763,551 A | 6/1998 | Wunsch et al. |
| 5,773,521 A | 6/1998 | Hoxmeier et al. |
| 5,777,037 A | 7/1998 | Yamanaka et al. |
| 5,807,629 A | 9/1998 | Elspass et al. |
| 5,811,501 A | 9/1998 | Chiba et al. |
| 5,834,563 A | 11/1998 | Kimura et al. |
| 5,847,054 A | 12/1998 | McKee et al. |
| 5,849,847 A | 12/1998 | Quirk |
| 5,855,972 A | 1/1999 | Kaeding |
| 5,883,173 A | 3/1999 | Elspass et al. |
| 5,891,947 A | 4/1999 | Hall et al. |
| 5,905,116 A | 5/1999 | Wang et al. |
| 5,910,530 A | 6/1999 | Wang et al. |
| 5,936,023 A | 8/1999 | Kato et al. |
| 5,955,537 A | 9/1999 | Steininger et al. |
| 5,986,010 A | 11/1999 | Clites et al. |
| 5,994,468 A | 11/1999 | Wang et al. |
| 6,011,116 A | 1/2000 | Aoyama et al. |
| 6,013,699 A | 1/2000 | Freeman et al. |
| 6,020,446 A | 2/2000 | Okamoto et al. |
| 6,025,416 A | 2/2000 | Proebster et al. |
| 6,025,445 A | 2/2000 | Chiba et al. |
| 6,034,164 A | 3/2000 | Elspass et al. |
| 6,060,549 A | 5/2000 | Li et al. |
| 6,060,559 A | 5/2000 | Feng et al. |
| 6,087,016 A | 7/2000 | Feeney et al. |
| 6,087,456 A | 7/2000 | Sakaguchi et al. |
| 6,106,953 A | 8/2000 | Zimmermann et al. |
| 6,117,932 A | 9/2000 | Hasegawa et al. |
| 6,121,379 A | 9/2000 | Yamanaka et al. |
| 6,127,488 A | 10/2000 | Obrecht et al. |
| 6,147,151 A | 11/2000 | Fukumoto et al. |
| 6,180,693 B1 | 1/2001 | Tang et al. |
| 6,191,217 B1 | 2/2001 | Wang et al. |
| 6,197,849 B1 * | 3/2001 | Zilg et al. .................. 523/216 |
| 6,204,354 B1 | 3/2001 | Wang et al. |
| 6,225,394 B1 | 5/2001 | Lan et al. |
| 6,255,372 B1 | 7/2001 | Lin et al. |
| 6,268,451 B1 | 7/2001 | Faust et al. |
| 6,277,304 B1 | 8/2001 | Wei et al. |
| 6,348,546 B2 | 2/2002 | Hiiro et al. |
| 6,359,075 B1 | 3/2002 | Wollum et al. |
| 6,383,500 B1 | 5/2002 | Wooley et al. |
| 6,395,829 B1 | 5/2002 | Miyamoto et al. |
| 6,420,486 B1 | 7/2002 | DePorter et al. |
| 6,437,050 B1 | 8/2002 | Krom et al. |
| 6,441,090 B1 | 8/2002 | Demirors et al. |
| 6,472,460 B1 | 10/2002 | Okamoto et al. |
| 6,486,253 B1 | 11/2002 | Gilmer et al. |
| 6,489,378 B1 | 12/2002 | Sosa et al. |
| 6,524,595 B1 | 2/2003 | Perrier et al. |
| 6,573,330 B1 | 6/2003 | Fujikake et al. |
| 6,598,645 B1 | 7/2003 | Larson |
| 6,612,351 B1 | 9/2003 | Zanzig |
| 6,617,020 B2 | 9/2003 | Zhou et al. |
| 6,649,702 B1 | 11/2003 | Rapoport et al. |
| 6,689,469 B2 | 2/2004 | Wang et al. |
| 6,693,746 B1 | 2/2004 | Nakamura et al. |
| 6,706,804 B2 | 3/2004 | Resendes |
| 6,706,813 B2 | 3/2004 | Chiba et al. |
| 6,706,823 B2 | 3/2004 | Wang et al. |
| 6,727,311 B2 * | 4/2004 | Ajbani et al. ................ 524/447 |
| 6,737,486 B2 | 5/2004 | Wang |
| 6,750,297 B2 | 6/2004 | Yeu et al. |
| 6,759,464 B2 | 7/2004 | Ajbani et al. |
| 6,777,500 B2 | 8/2004 | Lean et al. |
| 6,780,937 B2 | 8/2004 | Castner |
| 6,818,693 B2 | 11/2004 | Heinrich et al. |
| 6,835,781 B2 | 12/2004 | Kondou et al. |
| 6,849,680 B2 | 2/2005 | Knudson, Jr. et al. |
| 6,858,665 B2 | 2/2005 | Larson |
| 6,861,462 B2 | 3/2005 | Parker et al. |
| 6,872,785 B2 | 3/2005 | Wang et al. |
| 6,875,818 B2 | 4/2005 | Wang |
| 6,908,958 B2 | 6/2005 | Maruyama et al. |
| 6,956,084 B2 | 10/2005 | Wang et al. |
| 7,019,063 B2 | 3/2006 | Wada et al. |
| 7,071,246 B2 | 7/2006 | Xie et al. |
| 7,112,369 B2 | 9/2006 | Wang et al. |
| 7,179,864 B2 | 2/2007 | Wang |
| 7,205,370 B2 | 4/2007 | Wang et al. |
| 7,241,829 B2 | 7/2007 | Chung et al. |
| 7,371,793 B2 | 5/2008 | Gong et al. |
| 2001/0053813 A1 | 12/2001 | Konno et al. |
| 2002/0007011 A1 | 1/2002 | Konno et al. |
| 2002/0045714 A1 | 4/2002 | Tomalia et al. |
| 2002/0095008 A1 | 7/2002 | Heinrich et al. |
| 2002/0144401 A1 | 10/2002 | Nogueroles Vines et al. |
| 2003/0004250 A1 | 1/2003 | Ajbani et al. |
| 2003/0032710 A1 | 2/2003 | Larson |
| 2003/0124353 A1 | 7/2003 | Wang et al. |
| 2003/0130401 A1 | 7/2003 | Lin et al. |
| 2003/0149185 A1 | 8/2003 | Wang et al. |
| 2003/0198810 A1 | 10/2003 | Wang et al. |
| 2003/0225190 A1 | 12/2003 | Borbely et al. |
| 2004/0033345 A1 | 2/2004 | Dubertret et al. |
| 2004/0059057 A1 | 3/2004 | Swisher et al. |
| 2004/0127603 A1 | 7/2004 | Lean et al. |
| 2004/0143064 A1 | 7/2004 | Wang |
| 2004/0147639 A1 | 7/2004 | Tsou et al. |
| 2004/0198917 A1 | 10/2004 | Castner |
| 2004/0226643 A1 | 11/2004 | Yagi et al. |
| 2004/0249045 A1 | 12/2004 | Goodman et al. |
| 2005/0027057 A1 | 2/2005 | Dias et al. |
| 2005/0027062 A1 | 2/2005 | Waddell et al. |
| 2005/0098252 A1 | 5/2005 | Muraoka et al. |
| 2005/0101743 A1 | 5/2005 | Stacy et al. |
| 2005/0137288 A1 | 6/2005 | Maruo et al. |
| 2005/0192408 A1 | 9/2005 | Wang et al. |
| 2005/0197462 A1 | 9/2005 | Wang et al. |
| 2005/0203248 A1 | 9/2005 | Zheng et al. |
| 2005/0215693 A1 * | 9/2005 | Wang et al. ................ 524/445 |
| 2005/0222335 A1 | 10/2005 | Jones et al. |
| 2005/0228074 A1 | 10/2005 | Warren et al. |
| 2005/0277723 A1 | 12/2005 | Gong et al. |
| 2005/0282956 A1 | 12/2005 | Wang et al. |
| 2006/0084722 A1 | 4/2006 | Bohm et al. |

| | | | |
|---|---|---|---|
| 2006/0100339 A1 | 5/2006 | Gong et al. | |
| 2006/0173130 A1 | 8/2006 | Wang et al. | |
| 2006/0205916 A1* | 9/2006 | Takekoshi et al. | 528/272 |
| 2006/0235128 A1 | 10/2006 | Wang et al. | |
| 2007/0015853 A1 | 1/2007 | Weng et al. | |
| 2007/0129477 A1 | 6/2007 | Weng et al. | |
| 2007/0142550 A1 | 6/2007 | Scurati et al. | |
| 2007/0142559 A1 | 6/2007 | Wang et al. | |
| 2007/0149649 A1 | 6/2007 | Wang et al. | |
| 2007/0161734 A1 | 7/2007 | Fudemoto et al. | |
| 2007/0161754 A1 | 7/2007 | Wang et al. | |
| 2007/0185273 A1 | 8/2007 | Wang et al. | |
| 2007/0196653 A1 | 8/2007 | Hall et al. | |
| 2007/0238822 A1 | 10/2007 | Wang et al. | |
| 2007/0293684 A1 | 12/2007 | Fudemoto et al. | |
| 2008/0009579 A1 | 1/2008 | Gong et al. | |
| 2008/0081866 A1 | 4/2008 | Gong et al. | |

FOREIGN PATENT DOCUMENTS

| | | |
|---|---|---|
| DE | 4241538 | 6/1994 |
| EP | 0143500 | 6/1985 |
| EP | 0255170 | 2/1988 |
| EP | 0265142 | 4/1988 |
| EP | 0265145 | 4/1988 |
| EP | 0322905 | 7/1989 |
| EP | 0352042 | 1/1990 |
| EP | 0472344 | 2/1992 |
| EP | 0540942 | 5/1993 |
| EP | 0590491 | 4/1994 |
| EP | 0742268 | 11/1996 |
| EP | 1031605 | 8/2000 |
| EP | 1099728 | 5/2001 |
| EP | 1125927 | 8/2001 |
| EP | 1134251 | 9/2001 |
| EP | 1273616 | 1/2003 |
| EP | 1321489 | 6/2003 |
| JP | 01279943 | 1/1989 |
| JP | 1955517 | 8/1989 |
| JP | 05132605 | 5/1993 |
| JP | 06248017 | 9/1994 |
| JP | 08199062 | 8/1996 |
| JP | 3356001 | 10/2002 |
| WO | 91/04992 | 4/1991 |
| WO | 9704029 | 2/1997 |
| WO | 9942518 | 8/1999 |
| WO | 0075226 | 12/2000 |
| WO | 01/87999 | 11/2001 |
| WO | 02/31002 | 4/2002 |
| WO | 02/081233 | 10/2002 |
| WO | 02081233 | 10/2002 |
| WO | 02/100936 | 12/2002 |
| WO | 03/032061 | 4/2003 |
| WO | 03085040 | 10/2003 |
| WO | 2004/058874 | 7/2004 |
| WO | 2007/149842 | 12/2007 |

OTHER PUBLICATIONS

Gilman, J.W. et al., "Recent Advances in Flame Retardant Polymer Nanocomposites", pp. 273-283.*
Hay, J.N. et al., "A Review of Nanocomposites" (2000).*
Bahadur, Pratap, "Block copolymers- Their microdomain formation (in solid state) and surfactant behaviour (in solution)", Current Science, vol. 80, No. 8, pp. 1002-1007, Apr. 25, 2001.
Guo, Andrew et al., "Star Polymers and Nanospheres from Cross-Linkable Diblock Copolymers", Macromolecules, vol. 29, pp. 2487-2493, Jan. 17, 1996.
Ishizu, Koji et al., "Core-Shell Type Polymer Microspheres Prepared from Block Copolymers", Journal of Polymer Science: Part C: Polymer Letters, vol. 26, pp. 281-286, 1988.
Ishizu, Koji, "Synthesis and Structural Ordering of Core-Shell Polymer Microspheres", Prog. Polym. Sci., vol. 23, pp. 1383-1408, 1998.

O'Reilly, Rachel K. et al., "Cross-linked block copolymer micelles: functional nanostructures of great potential and versatility", Chem. Soc. Rev., vol. 35, pp. 1068-1083, Oct. 2, 2006.
Oranli, Levent et al., "Hydrodynamic studies on micellar solutions of styrene-butadiene block copolymers in selective solvents", Can. J. Chem., vol. 63, pp. 2691-2696, 1985.
Pispas, S. et al., "Effect of Architecture on the Micellization Properties of Block Copolymers: $A_2B$ Miktoarm Stars vs AB Diblocks", Macromolecules, vol. 33, pp. 1741-1746, Feb. 17, 2000.
Riess, Gerard, "Micellization of block copolymers", Prog. Polym. Sci., vol. 28, pp. 1107-1170, Jan. 16, 2003.
Saito, Reiko et al., "Synthesis of microspheres with 'hairy-ball' structures from poly (styrene-b-2-vinyl pyridine) diblock copolymers", Polymer, vol. 33, No. 5, pp. 1073-1077, 1992.
Thurmond, K. Bruce et al., "Shell cross-linked polymer micelles: stabilized assemblies with great versatility and potential", Colloids and Surfaces B: Biointerfaces, vol. 16, pp. 45-54, 1999.
Wilson, D.J. et al., "Photochemical Stabilization of Block Copolymer Micelles", Eur. Polym. J., vol. 24, No. 7, pp. 617-621, 1988.
Polymer Layered Silicate Nanocomposites, Giannelis E.P. Advanced Materials vol. 8, No. 1, Jan. 1, 1996 pp. 29-35.
Star Polymers by Immobilizing Functional Block Copolymers, by Koji Ishizu, Tokyo Institute of Technology, Meguro-ku, Tokyo, Japan, Star and Hyperbranched Polymers, 1999, ISBN 0-8247-1986-7.
Formation of Worm-like Micelles from a Polystyrene-Polybutadiene-Polystyrene Block Copolymer in Ethyl Acetate, Canham et al., J.C.S. Faraday I, 1980, 76, 1857-1867.
Anomalous Behaviour of Solutions of Styrene-Butadiene Block Copolymers in Some Solvents, Tuzar et al., Makromol. Chem. 178, 22743-2746, 1977.
Association of Block Copolymers in Selective Solvents, 1 Measurements on Hydrogenated Poly(styrene-isoprene) in Decane and in trans-Decalin, Mandema et al., Makromol. Chem. 180, 1521-1538, 1979.
Light-Scattering Studies of a Polystyrene-Poly(methyl methacrylate) Two-Blcok Copolymer in Mixed Solvents, Utiyama et al. Macromolecules vol. 7, No. 4, Jul.-Aug. 1974.
Greenwod, N.N.; Earnshaw, A., Chemistry of the Elements, pp. 1126-1127, Pergaroen Press, New York 1984.
Funtionalized Core-Shell Polymers Prepared by Microemulsion Polymerization, E. Mendizabal et al., Dept. of Ingenieria Quimica, Unviv. De Guadalajara, MX, 477/ANTE 97/1733-1737.
Kink-Block and Gauche-Block Structures of Bimolecular Films, Gehard Lagaly, Chem. Int. Ed. Engl. vol. 15 (1976) No. 10, pp. 575-586.
Linear Viscoelasticity of Disordered Polystyrene-Polyisoprene . . . Layered-Silicate Nanocomposites, J. Ren, Dept. of Chem Eng. Univ. of Houston, Macromol. 2000, pp. 3739-3746.
Rheology of End-Tethered Polymer Layered Silicate Nanocomposites, R. Krishnamoorti et al., Macromol. 1997, 30, 4097-4102.
Rheology of Nanocomposites Based on Layered Silicates and Polyamide-12, B. Hoffman et al., Colloid Polm. Sci. 278:629-636 (2000).
Quaternary Ammonium Compounds, Encyclopedia of Chem Tech., 4th Ed. vol. 20, 1996, Wiley & Sons, pp. 739-767.
Dendritic Macromolecules: Synthesis of Starburst Dendrimers, Donald A. Tomalia et al., Macromolecules vol. 19, No. 9, 1986, contribution from Functional Polymers/Processes and the Analytical Laboratory, Dow Chemical, Midland, MI 48640, pp. 2466-2468.
Preparation and Characterization of Heterophase Blends of Polycaprolactam and Hydrogenated Polydienes, David F. Lawson et al., pp. 2331-2351, Central Research Labs., The Firestone Tire and Rubber Col, Akron, OH 44317, Journal of Applied Polymer Science, vol. 39, 1990 John Wiliey & Sons, Inc.
R.P. Quirk and S.C. Galvan, Macromolecules, 34, 1192-1197 (2001).
M. Moller, J.P. Spaz, A. Roescher, S. Mobmer, S.T. Selvan, H.A. Klok, Macromol. Symp. 117, 207-218 (1997).
T. Cosgrove, J.S. Phipps, R.M. Richardson, Macromolecules, 26, 4363-4367 (1993).
S. Mossmer, J.P. Spatz, M.Moller, T. Aberle, J. Schmidt, W. Burchard, Macromol. 33, 4791-4798 (2000).

Ultrahydrophobic and Ultrayophobic Surfaces: Some Comments and Examples, Wei Chen et al., The ACS Journal of Surfaces and Colloids, May 11, 1999, vol. 15, No. 10, pp. 3395-3399, Polymer Science and Engineering Dept., Univ. of MA, Amherst, Ma 01003.

Super-Repellent Composite Fluoropolymer Surfaces, S.R. Coulson, I. Woodward, J.P.S. Badyal, The Journal of Physical Chemistry B, vol. 104, No. 37, Sep. 21, 2000, pp. 8836-8840, Dept. of Chemistry, Science Laboratories, Durham University, Durham, DH1 3LE, England, U.K.

Transformation of a Simple Plastic into a Superhydrophobic Surface, H. Yildirim Erbil et al., Science vol. 299, Feb. 28, 2003, pp. 1377-1380.

Reaction of Primary Aliphatic Amines with Maleic Anhydride, Lester E. Coleman et al., J. Org,. Chem., 24, 185, 1959, pp. 135-136.

Synthesis, Thermal Properties and Gas Permeability of Poly (N-n-alkylmaleimide)s, A. Matsumoto et al., Polymer Journal vol. 23, No. 3, 1991, pp. 201-209.

Simultaneous TA and MS Analysis of Alternating Styrene-Malei Anhydride and Styrene-Maleimide Copolymers, Thermochim. Acta, 277, 14, 1996.

Synthesis and Photocrosslinking of Maleimide-Type Polymers, Woo-Sik Kim et al., Macromol. Rapid Commun., 17, 835, 1996, pp. 835-841.

Polysulfobetaines and Corresponding Cationic Polymers. IV. Synthesis and Aqueous Solution Properties of Cationic Poly (MIQSDMAPM), Wen-Fu Lee et al., J. Appl. Pol. Sci. vol. 59, 1996, pp. 599-608.

Chemical Modification of Poly (styrene-co-maleic anhydride) with Primary N-Alkylamines by Reactive Extrusion, I Vermeesch et al., J. Applied Polym. Sci., vol. 53, 1994, pp. 1365-1373.

Vulcanization Agents and Auxiliary Materials, Kirk-Othmer, Encyclopedia of Chemical Technology, 3rd Ed., Wiley Interscience, NY, 1982, vol. 22, pp. 390-403.

Polymer-m-Ionic-Liquid Electrolytes C. Tiyapiboonchaiya, D.R. MacFarlane, J. Sun, M. Forsyth, Micromol. Chem. Phys., 2002, 203, pp. 1906-1911.

EXAFS Investigations of the Mechanism of Facilitated Ion Transfer into a Room-Temperature Ionic Liquid. M. Jensen, J.A. Dzielawa, P. Rickert, M.L. Dietz, Jacs, 2002, 124, pp. 10664-10665.

Structure of molten 1,3-dimethylimidazolium chloride using neutron diffraction.C. Hardacre, J.D. Holbrey, S.E. J. McMath, D.T. Bowron, A.K. Soper, J. Chem. Physics, 2003, 118(1), pp. 273-278.

Reverse Atom Transfer Radical Polymerization of Methyl Methacrylate in Room-Temperature Inoic Liqquids, H. Ma, X. Wan, X. Chen, Q-F. Zhou, J. Polym. Sci., A. Polym. Chem. 2003, 41, pp. 143-151.

Non-Debye Relaxations in Disordered Ionic Solids, W. Dieterich, P. Maass, Chem. Chys. 2002, 284, pp. 439-467.

"Dendrimers and Dendrons, Concept, Synthesis, Application", edited by Newkome G.R, Wiley-VCH, 2001, pp. 45, 191-310.

"Synthesis, Functionalization and Surface Treatment of Nanoparticles", edited by Baraton M-I, ASP (Am. Sci. Pub.), Stevenson Ranch, California, 2003, pp. 51-52, 174-208.

Ege, Seyhan, Organic Chemistry Structure and Reactivity, 3rd Edition, p. 959, 1994.

Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).

Alexandridis, Paschalis et al., "Amphiphilic Block Copolymers: Self-Assembly and Applications", Elsevier Science B.V., pp. 1-435 (2000).

Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).

Antonietti, Markus et al., "Determination of the Micelle Architecture of Polystyrene/Poly(4-vinylpridine) Block Copolymers in Dilute Solution", Macromolecules, 27, pp. 3276-3281 (1994).

Antonietti, Markus et al., "Novel Amphiphilic Block Copolymers by Polymer Reactions and Their Use for Solubilization of Metal Salts and Metal Colloids", Macromolecules, 29, pp. 3800-3806 (1996).

Batzilla, Thomas et al., "Formation of intra- and intermolecular crosslinks in the radical crosslinking of poly(4-vinylstyrene)", Makromol. Chem., Rapid Commun. 8, pp. 261-268 (1987).

Bauer, B.J. et al., "Synthesis and Dilute-Solution Behavior of Model Star-Branched Polymers", Rubber Chemistry and Technology, vol. 51, pp. 406-436 (1978).

Berger, G. et al., "Mutual Termination of Anionic and Cationic 'Living' Polymers", Polymer Letters, vol. 4, pp. 183-186 (1966).

Bradley, John S., "The Chemistry of Transition Metal Colloids", Clusters and Colloids: From Theory to Applications, Chapter 6, Weinheim, VCH, pp. 459-544 (1994).

Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).

Calderara, Frederic et al., "Synthesis of chromophore-labelled polystyrene/poly(ethylene oxide) diblock copolymers", Makromol. Chem., 194, pp. 1411-1420 (1993).

Chen, Ming-Qing et al., "Graft Copolymers Having Hyrdophobic Backbone and Hydrophilic Branches. XXIII. Particle Size Control of Poly(ethylene glycol)- Coated Polystyrene Nanoparticles Prepared by Macromonomer Method", Journal of Polymer Science: Part A: Polymer Chemistry, vol. 37, pp. 2155-2166 (1999).

Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).

Erhardt, Rainer et al., Macromolecules, vol. 34, No. 4, pp. 1069-1075 (2001).

Eschwey, Helmut et al., "Preparation and Some Properties of Star-Shaped Polymers with more than Hundred Side Chains", Die Makromolekulare Chemie 173, pp. 235-239 (1973).

Eschwey, Helmut et al., "Star polymers from styrene and divinylbenzene", Polymer, vol. 16, pp. 180-184 (Mar. 1975).

Fendler, Janos H., "Nanoparticles and Nanostructured Films: Preparation, Characterization and Applications", Wiley-VCH, pp. 1-468 (1998).

Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).

Hamley, Ian W., "The Physics of Block Copolymers", Oxford Science Publication: Oxford, Chapters 3 and 4, pp. 131-265, (1998).

Ishizu, Koji et al., "Synthesis of Star Polymer with Nucleus of Microgel", Polymer Journal, vol. 12, No. 6, pp. 399-404 (1980).

Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).

Liu, Guojun et al., "Diblock Copolymer Nanofibers", Macromolecules, 29, pp. 5508-5510 (1996).

Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).

Ma, Qinggao et al., "Entirely Hydrophilic Shell Cross-Linked Knedel-Like (SCK) Nanoparticles", Polymer Preprints, vol. 41, No. 2, pp. 1571-1572 (2000).

Mayer, A.B.R. et al., "Transition metal nanoparticles protected by amphiphilic block copolymers as tailored catalyst systems", Colloid Polym. Sci., 275, pp. 333-340 (1997).

Mi, Yongli et al., "Glass transition of nano-sized single chain globules", Polymer 43, Elsevier Science Ltd., pp. 6701-6705 (2002).

Nace, Vaughn M., "Nonionic Surfactants: Polyoxyalkylene Block Copolymers", Surfactant Science Series, vol. 60, pp. 1-266 (1996).

Okay, Oguz et al., "Steric stabilization of reactive microgels from 1,4-divinylbenzene", Makromol. Chem., Rapid Commun., vol. 11, pp. 583-587 (1990).

Okay, Oguz et al., "Anionic Dispersion Polymerization of 1,4-Divinylbenzene", Macromolecules, 23, pp. 2623-2628 (1990).

Piirma, Irja, "Polymeric Surfactants", Surfactant Science Series, vol. 42, pp. 1-289 (1992).

Price, Colin, "Colloidal Properties of Block Copolymers", Applied Science Publishers Ltd., Chapter 2, pp. 39-80 (1982).

Rager, Timo et al., "Micelle formation of poly(acrylic acid)- block-poly(methyl methacrylate) block copolymers in mixtures of water with organic solvents", Macromol. Chem. Phys., 200, No. 7, pp. 1672-1680 (1999).

Rein, David H. et al., "Kinetics of arm-first star polymers formation in a non-polar solvent", Macromol. Chem. Phys., vol. 199, pp. 569-574 (1998).

Rempp, Paul et al., "Grafting and Branching of Polymers", Pure Appl. Chem., vol. 30, pp. 229-238 (1972).

Riess, Gerard et al., "Block Copolymers", Encyclopedia of Polymer Science and Engineering, vol. 2, pp. 324-434 (1985).

Saito, Reiko et al., "Synthesis of Microspheres with Microphase-Separated Shells", Journal of Polymer Science: Part A: Polymer Chemistry, vol. 38, pp. 2091-2097 (2000).

Serizawa, Takeshi et al., "Transmission Electron Microscopic Study of Cross-Sectional Morphologies of Core-Corona Polymeric Nanospheres", Macromolecules, 33, pp. 1759-1764 (2000).

Stepanek, Miroslav et al. "Time-Dependent Behavior of Block Polyelectrolyte Micelles in Aqueous Media Studied by Potentiometric Titrations, QELS and Fluoroetry", Langmuir, Vo. 16, No. 6, pp. 2502-2507 (2000).

Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).

Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).

Tsitsilianis, Constantinos et al., Makromol. Chem. 191, pp. 2319-2328 (1990).

Tuzar, Zdenek et al., "Micelles of Block and Graft Copolymers in Solutions", Surface and Colloid Science, vol. 15, Chapter 1, pp. 1-83 (1993).

Vamvakaki, M. et al., "Synthesis of novel block and statistical methacrylate-based ionomers containing acidic, basic or betaine residues", Polymer, vol. 39, No. 11, pp. 2331-2337 (1998).

van der Maarel, J.R.C. et al., "Salt-Induced Contraction of Polyelectrolyte Diblock Copolymer Micelles", Langmuir, vol. 16, No. 19, pp. 7510-7519 (2000).

Wang, Xiaorong et al., "Chain conformation in two-dimensional dense state", Journal of Chemical Physics, vol. 121, No. 16, pp. 8158-8162 (Oct. 22, 2004).

Wang, Xiaorong et al., "Synthesis, Characterization, and Application of Novel Polymeric Nanoparticles", Macromolecules, 40, pp. 499-508 (2007).

Webber, Stephen E. et al., "Solvents and Self-Organization of Polymers", NATO ASI Series, Series E: Applied Sciences, vol. 327, pp. 1-509 (1996).

Wooley, Karen L, "From Dendrimers to Knedel-like Structures", Chem. Eur. J., 3, No. 9, pp. 1397-1399 (1997).

Wooley, Karen L, "Shell Crosslinked Polymer Assemblies: Nanoscale Constructs Inspired from Biological Systems", Journal of Polymer Science: Part A: Polymer Chemistry, vol. 38, pp. 1397-1407 (2000).

Worsfold, D.J., "Anionic Copolymerization of Styrene with p-Divinylbenzene", Macromolecules, vol. 3, No. 5, pp. 514-517 (Sep.-Oct. 1970).

Zheng, Lei et al., " Polystyrene Nanoparticles with Anionically Polymerized Polybutadiene Brushes", Macromolecules, 37, pp. 9954-9962 (2004).

Zilliox, Jean-Georges et al., "Preparation de Macromolecules a Structure en Etoile, par Copolymerisation Anionique", J. Polymer Sci.: Part C, No. 22, pp. 145-156 (1968).

Baranova, O. V. et al., "Effect of the Structure of Phase-Transfer Catalyst on the Rate of Alkaline Hydrolysis of N-Benzyloxycarbonylglycine 4-Nitrophenyl Ester in the System Chloroform-Borate Buffer", Russian Journal of Organic Chemistry, vol. 38, No. 3, pp. 378-384, 2002.

Wang, Yizhong et al., "Preparation and Characterization of Rubber-Clay Nanocomposites", Journal of Applied Polymer Science, vol. 78, pp. 1879-1883 (2000).

Webb, Paul B. et al., "Continuous Flow Hydroformylation of Alkenes in Supercritical Fluid-Ionic Liquid Biphasic Systems", J. Am. Chem. Soc., vol. 125, pp. 15577-15588, 2003.

Wilkes, John S. et al., "Dialkylimidazolium Chloroaluminate Melts: A New Class of Room-Temperature Ionic Liquids for Electrochemistry, Spectroscopy, and Synthesis", Inorg. Chem., vol. 21, pp. 1263-1264, 1982.

International Search Report with Written Opinion dated Dec. 27, 2007 from corresponding PCT Application No. PCT/US2007/071539 (11 pp.).

Wang et al., U.S. Appl. No. 11/344,861, filed Feb. 1, 2006 entitled: "Nano-Composite And Compositions Therefrom".

Wyrozebski Lee, Katarzyna I., Oct. 17, 2008 Office Action from U.S. Appl. No. 10/536,278, filed Jan. 17, 2006 (11 pp.).

Wyrozebski Lee, Katarzyna I., Dec. 31, 2007 Office Action from U.S. Appl. No. 11/077,595, filed Mar. 11, 2005 (13 pp.).

Wyrozebski Lee, Katarzyna I., Jul. 22, 2008 Office Action from U.S. Appl. No. 11/077,595, filed Mar. 11, 2005 (8 pp.).

Wyrozebski Lee, Katarzyna I., Oct. 6, 2008 Office Action from U.S. Appl. No. 11/344,861, filed Feb. 1, 2006 (15 pp.).

Wyrozebski Lee, Katarzyna I., Oct. 20, 2008 Office Action from U.S. Appl. No. 11/642,190, filed Dec. 20, 2006 (12 pp.).

Russell, Graham, Nov. 4, 2008 Office Action from European Patent Application No. 05742316.2 filed Mar. 28, 2005 (2 pp.).

May 28, 2004 International Search Report from PCT Patent Application No. PCT/US03/40375 filed Dec. 18, 2003 (3 pp.).

Aug. 1, 2005 International Search Report form PCT Patent Application No. PCT/US2005/010352 filed Mar. 28, 2005 (3 pp.).

Dec. 27, 2007 International Search Report from PCT Patent Application No. PCT/US2007/071539 filed Jun. 19, 2007 (4 pp.).

Russell, G., Feb. 22, 2006 International Preliminary Report on Patentability from PCT Patent Application No. PCT/US2005/010352 (7 pp.).

* cited by examiner

NANO-COMPOSITE AND COMPOSITIONS MANUFACTURED THEREOF

BACKGROUND OF THE INVENTION

The present invention is directed to nano-composites, alternatively referred to as organo-clay. More particularly, the invention is directed to a cationic mediator comprised of a hydrophobic unit and a heterocyclic cationic unit used to prepare nano-composites and rubber compositions including the nano-composites.

Since the discovery of exfoliated nylon/clay nanocomposites by Usuki et al. (J. Mater. Res. 1993, 8, 1174), there have been extensive efforts directed to the preparation of various polymer-layered material composites. One common morphology for miscible polymer-layered material dispersions is known as intercalation and exfoliation, which improves polymeric properties such as mechanical, gas barrier/permeability, thermal, and heat distortion temperature. However, for polymers, particularly nonpolar polymers, well-exfoliated polymer-layered material nanocomposites are notoriously difficult to obtain.

Gas permeability is an important element of quality for many polymer products, for example, butyl rubber. Unsaturated bonds in butyl rubber, contributed by the presence of isoprene monomer units in the backbone, can be attacked by atmospheric ozone. These attacks may, over time, lead to oxidative degradation, which may subsequently lead to chain cleavage. As such, there exists a continuous interest in lowering gas permeability of polymer products by various techniques, among which is using well-exfoliated layered materials as an additive. However, other properties such as vulcanization plateau, hardness Shore A, cure capability, rubber damping properties, cure time, modulus, stress, moisture absorption, and strain etc. cannot be negatively impacted.

The present invention provides nano-composites and polymeric compositions derived from a cationic mediator, comprised of a hydrophobic unit and a heterocyclic cationic unit. Advantageously, the invention can employ compounds used as green solvents, e.g. 1-methylimidazol, as the reactant in preparing the cationic mediator, making both the process and product more environmentally friendly.

SUMMARY OF THE INVENTION

According to one embodiment, the present invention provides a nano-composite, comprised of (a) a cationic mediator having a hydrophobic unit and a heterocyclic cationic unit, and (b) a clay, wherein said clay is exfoliated by said cationic mediator.

According to another embodiment, a composition comprising (a) a cationic mediator having a hydrophobic unit and a heterocyclic cationic unit, (b) a clay, and (c) a carbon-chain or a heterochain polymer is provided.

Still other embodiments of the invention provide novel rubber formulations and tire products including the nano-composites. The addition of the nano-composite can improve properties such as gas permeability, cure, and various mechanical properties.

According to a further embodiment of the invention, a method of exfoliating clays and producing a nano-composite is provided.

BRIEF DESCRIPTION OF THE DRAWINGS

The invention may take form in various components and arrangements of components, and in various steps and arrangements of steps. The drawings, in which like reference numerals denote like components throughout the several views, are only for purposes of illustrating preferred embodiments and are not to be construed as limiting the invention.

In the drawings appended hereto:

FIGS. 1-4 show the small-angel x-ray scattering patterns measured when ionic liquid surfactant treated mica and organo-clay/butyl rubber nanocomposite according to the present invention were irradiated with x-ray. The scattering of x-ray from these samples was caused by the difference of the electron densities in clay layers, surfactants and/or butyl rubber molecules. The scattering patterns were formed by the interference of secondary waves that were emitted from clay layers, surfactants and/or butyl rubber molecules. The result of SAXS is essentially the intensity of the Fourier transform of the electron density and reflects the microstructures of the sample. In accord with Bragg's law, structural parameters of the sample, such as distance between clay layers, can be calculated from the peak positions and intensities.

DETAILED DESCRIPTION OF ILLUSTRATIVE EMBODIMENTS

Figure 1:
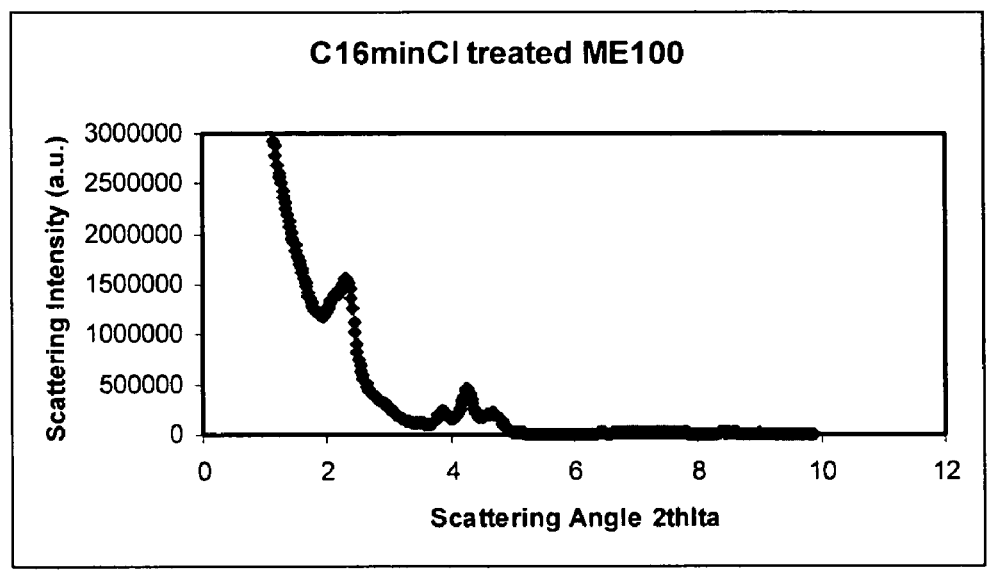
FIG. 1 shows small angle x-ray scattering (SAXS) of an ionic liquid surfactant treated mica.

The term "cationic mediator" is used in the present invention to describe a chemical species able to effectively mediate, or compatiblize, immiscible organic polymer and inorganic layered material such as clay, into a relatively homogenous state substantially without phase separation. Generally, the mediator facilitates the intercalation of organic polymer between the layers of the layered material.

The cationic mediator can comprise at least one cationic unit, which typically is also hydrophilic, that can bind to the layers of inorganic layered material with effectively higher affinity than to bonding to an organic material. The cationic mediator typically also includes a hydrophobic unit, such as butyl rubber. While a cationic mediator typically binds to an inorganic layered material by hydrophilic interaction or ionic bond, it can also bind or link to an organic material through a variety of physical and chemical forces such as hydrophobic interaction, covalent bonds, $\pi$-$\pi$ stacking interaction, lock-key type interaction, hydrogen bonds, and coordination bonds etc.

The cationic unit may be monoatomic or polyatomic, and bear one or more elementary charges of the proton, i.e. positive charges. Depending upon the specific structure of the cationic mediator, such as the presence or absence of a conjugated system and whether the cationic unit includes the optional conjugated system, the positive charge(s) can be either localized or delocalized. The cationic mediator can be accompanied by negatively charged species to balance its positive charge and neutralize the overall charge of the system. Although the negatively charged species is typically independent, e.g. a counter ion(s), it is also feasible that the negatively charged species is part of the cationic mediator, by which an inner salt is formed. In various embodiments, the counter ion of the cationic mediators may also be those negatively charged groups of the layers in the layered material, for example, after the cationic mediator has exchanged cation of the layered material by intercalating in between the layers.

Exemplary counter ions include, but are not limited to, simple anions such as $Cl^-$, $Br^-$, $F^-$, $I^-$, $O^{2-}$, $S^{2-}$, $Se^{2-}$, $Te^{2-}$, $N^{3-}$, $As^{3-}$, and the like; and polyatomic anions such as $BF_4^-$, $PF_6^-$, $CO_3^{2-}$, $HCO_3^-$, $SO_4^{2-}$, $CF_3SO_3^-$, $SO_3^{2-}$, $S_2O_3^{2-}$, $HSO_4^-$, $H_2PO_4^-$, $HPO_4^{2-}$, $PO_4^{3-}$, $NO_2^-$, $NO_3^-$, $C_2O_4^{2-}$, $C_2H_3O_2^-$, $OH^-$, $O_2^{2-}$, $N_3^-$, $CrO_4^{2-}$, $Cr_2O_7^{2-}$, $BO_3^{3-}$, $MnO_4^-$, $AsO_4^{3-}$, $SCN^-$, $CN^-$, $CNO^-$, $ClO^-$, $ClO_2^-$, $ClO_3^-$, $ClO_4^-$, $BrO^-$, $BrO_2^-$, $BrO_3^-$, $BrO_4^-$, $IO^-$, $IO_2^-$, $IO_3^-$, $IO_4^-$, and the like.

The present invention provides a nano-composite comprising (a) a cationic mediator comprised of a hydrophobic unit and a heterocyclic cationic unit, and (b) a clay, wherein said clay is intercalated and/or exfoliated by said cationic mediator. In one embodiment, the cationic mediator does not degrade at temperatures up to about 150° F., preferably up to about 250° F., more preferably up to about 350° F., and even more preferably up to about 400° F. Preferably, the clay will be sufficiently exfoliated to provide an average gap greater than about 0.1 nm between layers.

The heterocyclic cation unit of the present invention may be, but is not limited to, imidazolium, 1-alkylimidazolium, 1,3-dialkylimidazolium, 1-arylalkylimidazolium, 1-arylalky-3-alkyl-limidazolium, 1,3-diarylalkylimidazolium, benzimidazolium, imidazolinium, pyridinium, piperidinium, pyrazinium, piperazinium, pyrrolium, pyrrolidinium, pyrazolium, diazolium, triazolium, pyridazinium, tetrazolium, amidinium, guanidinium, oxazolium, oxadiazolium, oxatriazolium, thiazolium, thiadiazolium, thiatriazolium, quaternary pyrazolidine, quaternary pyrrolidones, indolium, isoindolium, quinolinium, isoquinolinium, quinazolinium, quinoxalinium, derivates thereof, and mixtures thereof.

The hydrophobic unit may be selected from the group consisting of butyl, isobutyl, behenyl, palmitoleyl, oleyl, linoleyl, linelenyl, erucyl, capryl, tallow, n-pentyl, any isopentyl, n-hexyl, any isohexyl, n-heptyl, any isoheptyl, n-octyl, any isooctyl, n-nonyl, any isononyl, n-decyl, any isodecyl, n-undecyl, any isoundecyl, n-dodecyl or lauryl, any isododecyl, n-tridecyl, any isotridecyl, n-tetradecyl, myristyl, any isotetradecyl, n-pentadecyl, any isopentadecyl, n-hexadecyl or cetyl, palmityl, any isohexadecyl, n-heptadecyl, any isoheptadecyl, n-octadecyl, stearyl, any isooctadecyl, n-nonadecyl, any isononadecyl, n-eicosyl, any isoeicosyl, n-henicosyl, any isohenicosyl, n-docosyl, any isodocosyl, n-tricosyl, any isotricosyl, n-tetracosyl, any isotetracosyl, n-pentacosyl, any isopentacosyl, n-hexacosyl, any isohexacosyl, n-heptacosyl, any isoheptacosyl, n-octacosyl, any isooctacosyl, n-nonacosyl, any isononacosyl, n-triacontyl, any isotriacontyl, n-hentriacontyl, any isohentriacontyl, n-dotriacontyl, any isodotriacontyl, n-tritriacontyl, any isotritriacontyl, n-tetratriacontyl, any isotetratriacontyl, n-pentatriacontyl, any isopentatriacontyl, n-hexatriacontyl, any isohexatriacontyl, n-heptatriacontyl, any isoheptatriacontyl, n-octatriacontyl, any isooctatriacontyl, n-nonatriacontyl, any isononatriacontyl, n-tetracontyl, any isotetracontyl, n-hentetracontyl, any isohentetracontyl, n-dotetracontyl, any isodotetracontyl, n-tritetracontyl, any isotritetracontyl, n-tetratetracontyl, any isotetratetracontyl, n-pentatetracontyl, any isopentatetracontyl, n-hexatetracontyl, any isohexatetracontyl, n-heptatetracontyl, any isoheptatetracontyl, n-octatetracontyl, any isooctatetracontyl, n-nonatetracontyl, any isononatetracontyl, n-pentacontyl, isopentacontyl and mixtures thereof.

An exemplary cationic mediator has the formula (I) as shown below.

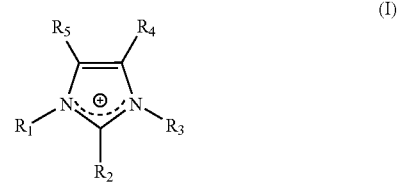

in which at least one of $R_1$, $R_2$, $R_3$, $R_4$, and $R_5$ can be the hydrophobic unit as defined above and up to four of the remaining of $R_1$, $R_2$, $R_3$, $R_4$, and $R_5$ can be independently of each other selected from hydrogen, methyl, ethyl, vinyl, allyl, propyl, isopropyl, or aryl-containing or hetaryl-containing group. As used herein, the terms "aryl" and "hetaryl" are intended to embrace monocyclic or polycyclic aromatic hydrocarbon and heterocyclic groups. Examples of aralkyl and alkylaralkyl groups include, but are not limited to, benzyl, benzhydryl, tolylmethyl, trityl, cinnamyl, phenethyl, styryl, phenylbutyl, neophyl, and the like. Examples of aryl and alkylaryl groups include, but are not limited to, phenyl, biphenyl, tolyl, xylyl, mesityl, cumenyl, di(t-butyl)phenyl, anthryl, indenyl, naphthyl, and the like. Haloaryl and haloaralkyl groups are aryl and aralkyl groups which have been substituted with one or more halo groups. Examples of such groups include, but are not limited to, halobenzyl (e.g., fluorobenzyl, chlorobenzyl, bromobenzyl, or iodobenzyl, whether ortho-, meta-, or para-substituted), dihalobenzyl, trihalobenzyl, tetrahalobenzyl, pentahalobenzyl, halophenyl (e.g., fluorophenyl, chlorophenyl, bromophenyl, or iodophenyl, whether ortho-, meta-, or para-substituted), dihalophenyl, trihalophenyl, tetrahalophenyl, and pentahalophenyl and mixtures thereof.

Specific examples of other aryl-containing and hetaryl-containing groups are phenoxy, tolyloxy, xylyloxy, mesityloxy, and cumenyloxy; biphenyl, anilino, toluidino, tosyl, allyl-benzyl or -phenyl, furyl, pyridyl, 2-pyridyl (pyridin-2-yl), indol-1-yl, chloromethyl-benzyl or -phenyl, trifluoromethyl-benzyl or -phenyl, hydroxy-benzyl or -phenyl, methoxy-benzyl or -phenyl, ethoxy-benzyl or -phenyl, methoxyethoxy-benzyl or -phenyl, allyloxy-benzyl or -phenyl, phenoxy-benzyl or -phenyl, acetoxy-benzyl or -phenyl, benzoyloxy-benzyl or -phenyl, methylthio-benzyl or -phenyl, phenylthio-benzyl or -phenyl, tolylthio-benzyl or -phenyl, methylamino-benzyl or -phenyl, dimethylamino-benzyl or -phenyl, ethylamino-benzyl or -phenyl, diethylamino-benzyl or -phenyl, acetylamino-benzyl or -phenyl, carboxy-benzyl or -phenyl, methoxycarbonyl-benzyl or -phenyl, ethoxycarbonyl-benzyl or -phenyl, phenoxycarbonyl-benzyl or -phenyl, chlorophenoxycarbonyl-benzyl or -phenyl, N-cyclohexylcarbamoyloxy-benzyl or -phenyl, allyloxycarbonyl-benzyl or -phenyl, carbamoyl-benzyl or -phenyl, N-methylcarbamoyl-benzyl or -phenyl, N,N-dipropylcarbamoyl-benzyl or -phenyl, N-phenylcarbamoyl-benzyl or -phenyl, nitro-benzyl or -phenyl, cyano-benzyl or -phenyl, sulfo-benzyl or -phenyl, sulfonato-benzyl or -phenyl, phosphono-benzyl or -phenyl, phosphonato-benzyl or -phenyl groups, and morpholino-benzyl or -phenyl and mixtures thereof.

Specific examples of the cationic mediator include the following cations with a halide such as chloride as their counter ion.

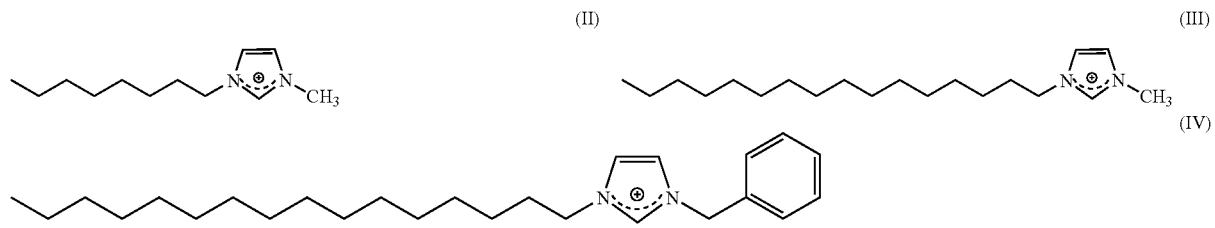

Optionally, the cationic mediator of the present invention may work together with another cationic mediator or surfactant in exfoliating clay and forming the nano-composite. Examples of the other cationic mediators include dimethyl ditallow ammonium, trimethyl tallow ammonium, dimethyl dihydrogenated tallow ammonium, methyl ethyl ditallow ammonium, methyl ethyl benzyl tallow ammonium, dimethyl ethyl tallow ammonium.

In preparing the cationic mediator, some reagents may be used as the precursors for the heterocyclic cationic unit. Examples of such reagents include, but are not limited to, imidazole, 1-methylimidazole, 1-benzylimidazole, pyrazine, pyrazole, pyridazine, pyridine, imidazolidine, piperazine, piperidine, pyrazolidine, pyrrolidine, the derivatives thereof, and the mixtures thereof. In some embodiments the reagent may be a room temperature ionic liquid that functions as a reactant, a solvent, and an environmentally friendly, nonvolatile, nonflammable, or recyclable agent. 1-methylimidazole and 1-benzyllimidazole are good examples of such room temperature ionic liquids and have been used in the present invention. For example, cationic mediators of formulas (II) and (III) can be formed by mixing alkyl halides such as octyl chloride or hexadecyl chloride with 1-methylimidazol at elevated temperatures, such as between about 23° C. to about 500° C., preferably between about 50° C. and about 180° C., more preferably between about 75° C. and about 100° C. A significant benefit is therefore the reduction, if not elimination, of harmful VOC emissions. Accordingly, certain of the cationic mediators disclosed herein can be used as a general-purpose surfactant, in addition to a clay exfoliating agent.

In certain embodiments, the cationic mediator may be used to exfoliate a layered material and form useful products such as a nano-composite, or organo-clay, or exfoliated clay. An exfoliated layered material does not retain the degree of order or uniformity in layer spacing and/or position that may be found in layered materials or intercalated layered materials. In the present invention, the ratio between clay and cationic mediator can be by weight from 5:95 to 95:5, preferably from 30:70 to 70:30, and more preferably from 40:60 to 60:40. Preferably, the exfoliated clay will have an average between-layer gap greater than about 0.1 nm, preferably greater than 1.0 nm, and more preferably greater than about 3.0 nm.

"Layered material" means an inorganic material that is in the form of a plurality of adjacent bound layers or plates. Layered materials used in the present invention are those that can give at least one of the cationic mediators access to their interlayer spaces through exchanging, partially or completely, their cations with cationic mediators, a process called intercalation. Intercalated layered materials may retain order or uniformity in layer spacing and/or layer position. In one embodiment, the layered material is first intercalated, and then exfoliated. In many cases, the layered material is clay, which typically comprises an inorganic phase having layered materials in plates or other shapes with a significantly high aspect ratio. The aspect ratio is defined as the ratio of the largest and smallest dimension of the clay particles.

Exemplary clays suitable for the present invention include, but are not limited to, synthetic mica; smectites such as montmorillonite (Bentonite), sodium montmorillonite, magnesium montmorillonite, calcium montmorillonite, beidellite, nontronite, hectorite, sodium hectorite, saponite, synthetic saponite, and sauconite; pyrophyllite; glauconites; vermiculites; polygorskines; sepiolites; allophanes; imogolites; talc; mica; fluoro-mica; illites; glauconite; phyllosilicates; volkonskoite; sobockite; stevensite; svinfordite; magadiite; kenyaite; kaolinite; dickite; nacrite; anauxite; ledikite; montronite; silicate; halloysite; metahalloysite; sericite; allophone; serpentine clays; chrysotile; antigorite; attapulgite; sepiolite; palygorskite; Kibushi clay; gairome clay; hisingerite; chlorite; and mixtures thereof.

Typical clays have a layered structure with a gap of about 0.1 nm between each layer and cations such as $K^+$ and $Na^+$ on the surface of each layer. The cations are attached by an ionic interaction with the negatively charged surface of the clay layers, and create a net neutral charge between clay layers.

In the exfoliation procedure, optionally, a clay may be first swelled by placing it in water. Swelling takes place because the cations of the clay become solubilized in the water, leaving adjacent negatively charged clay layers. The adjacent clay layers are repulsed by their similar negative charges, resulting in gaps of up to about 3 nm between the layers. A cationic mediator may then be added to the swollen clay to form an organo-clay or the nano-composite. Alternatively, before addition of the cationic mediator, the clay may be pre-exfoliated with a cationic surfactant such as an ammonium salts. In some embodiments, if an ionic liquid is used, the clay may be directly mixed with the cationic mediator. The cationic mediator is attracted to the negatively charged surface of the clay, keeping the swelling state stable and forming gaps of about 5-10 nm between the layers.

The intercalated cationic mediator may be accompanied by one or more polymers connected by forces such as hydrophobic interaction, π-π stacking interaction, lock-key type interaction, hydrogen bonds, coordination bonds, covalent bonds, and combinations thereof. Accordingly, the "mediation" of the cationic mediator, helps intercalate polymers between the layers of the layered material.

Additional non-polar polymer, such as rubber can further separate the layers of the clay, because the added polymer and the cationic mediator can attract each other at, e.g., their hydrophobic portions, and the added polymer will also penetrate between the clay layers. The large molecule size of the cationic mediator and/or the added polymer may counteract any remaining Van der Waals interactions between the clay layers and the clay can be fully exfoliated, i.e. separated into discrete layers.

Therefore, the present invention further provides a composition comprising (a) a cationic mediator including of a hydrophobic unit and a heterocyclic cationic unit, (b) a clay, and (c) a polymer, wherein the clay is exfoliated by the heterocyclic cationic mediator and the polymer.

There is no specific limitation on the polymers suitable for use in the present invention. However, preferred polymers are those that can intercalate between clay layers more effectively with than without the aid of the cationic mediator as demonstrated above. The polymer can have a saturated or unsaturated polyvinyl-type (i.e., carbon-chain) backbone, such as polychloroprene, polyethylene, isobutene-isoprene rubber (butyl rubber, IIR), halogenated butyl rubber (HIIR) such as ClIR and BrIIR, neoprene rubber, nitrile rubber (NBR), 1,2-polybutadiene, polyallene, polybutadiene (butadiene rubber, BR), polyisobutylene (PIB), polyisoprene, 3,4-polyisoprene, poly(methyl acrylate), poly(methyl vinyl ketone), ethylene-propylene elastomer, polystyrene (PS), polyacrylamide, poly(acrylamide oxime), polypropylene (PP), styrene-butadiene rubber (SBR), poly(methyl methacrylate), acrylonitrile-butadiene-styrene terpolymer (ABS), poly(vinyl chloride) (PVC), poly(vinylidene chloride), poly(vinyl pyridine), poly(vinyl pyrrolidone), poly(acrylic anhydride), polyacrylonitrile, styrene-acrylonitrile copolymer (SAN), ethylene-vinyl acetate copolymer (EVA), and the like.

The polymer can also possess a backbone with one or more functional groups such as carbonyl, or a non-carbon element such as N, S or O etc. (i.e. heterochain polymer). Exemplary heterochain polymers include, but are not limited to, polyether such as poly(oxyethylene), polyformadehyde, poly(phenylene oxide) or polyacetaldehyde; polyacrolein, polysulfide, polysulfone, poly(alkylene polysulfide), polyester, polycarbonate, polyphosphate ester, polyamide, polyurea, polyurethane, heterocyclic polymer, polyhydrazides, polyimide, melamine-formaldehyde resin (MF), polysaccharides, phenol-formaldehyde resin (PF), and polyanhydride etc.

The polymeric group can also be an inorganic or inorganic/organic polymer such as polysiloxane, polysilane, carborane polymer, and organometallic polymer etc.

The nano-composite may be utilized in rubber formulation and tire production. Effective exfoliation of clays and production of nano-clay are beneficial in improving gas permeability and other physical properties of rubber. As such, the present invention additionally provides a rubber formulation and a tire product, both comprising the nano-composite as described above.

An organo-clay (nano-composite) can be dispersed into a rubber such as butyl rubber. Optionally, preferably prior to dispersing the organo-clay in the rubber, the organo-clay may be washed and dried. Preferably, the organo-clay is washed with an alcohol, such as, but not limited to, isopropanol, water or mixtures thereof. According to the present invention, the rubber so formulated has lower gas permeability without incurring a negative effect on the cure properties associated with traditional clay/surfactant systems.

In a rubber formulation, additional stabilizers, antioxidants, conventional fillers, processing aids, accelerators, extenders, curing agents, reinforcing agents, reinforcing resins, pigments, fragrances, and the like can optionally be added. Specific examples of useful antioxidants and stabilizers include 2-(2'-hydroxy-5'-methylphenyl)benzotriazole, nickel di-butyl-di-thiocarbamate, tris(nonylphenyl)phosphite, 2,6-di-t-butyl-4-methylphenol, and the like. Exemplary conventional fillers and pigments include silica, carbon black, titanium dioxide, iron oxide, and the like. Suitable reinforcing materials are inorganic or organic products of high molecular weight. Examples include glass fibers, asbestos, boron fibers, carbon and graphite fibers, whiskers, quartz and silica fibers, ceramic fibers, metal fibers, natural organic fibers, and synthetic organic fibers.

As one exemplary benefit of the present invention, good cure properties and low gas permeability can both be achieved for some rubber formulations. Exemplary rubbers suitable to the present invention include, but not limited to, butyl rubber, BR, Hcis BR, SBR, NR and so on. As used herein, the butyl rubber composition may include isobutylene, halobutyl rubber, and copolymers of isobutylene and one or more additional monomers, such as isoprene, styrene, butadiene, and mixtures thereof. Tensile strength, gas permeability, and cure properties including cure capability and cure time etc. have been improved in various rubber compounds by using the nano-composite of the present invention. The butyl rubber composition is useful in the formation of inner liners for automobile tires and in applications requiring good damping characteristics, such as engine mounts. Other uses for the butyl rubber include use in air cushions, pneumatic springs, air bellows, accumulator bags, tire-curing bladders, high temperature service hoses, and conveyor belts for handling hot materials.

The nano-composite of the present invention can be advantageously incorporated into butyl rubber by any method known to a skilled artisan, for example, wet/solvent method or a dry mixing method under mild mixing conditions. Such mild mixing conditions are, for example, similar to those normally used in butyl rubber mixing. The mixing may be accomplished, for example, by using any integral mixing device such as a Brabender mixer, a twinscrew extruder or a kneader, at a mixing rate of from about 20 to about 200 rpm, at a temperature of about 25° C. to about 250° C. for a period of about 3~30 minutes. In one embodiment, the mixing conditions are for example, mixing in a Brabender mixer at about 60 rpm at a temperature of about 70° C. for about three minutes. Of course, the organo-clay can be added according to any other method known by the skilled artisan. It is preferred that between about 1 and about 70%, more preferably, between about 3 and about 40% by weight of organo-clay or nano-composite is incorporated into the butyl rubber. Preferably, the clay in the final product is at least about 50% exfoliated, more preferably at least about 70% exfoliated. The degree of exfoliation may be found using an image created by transmission electron microscopy (TEM). The image includes black areas representing clay particles. The ratio of the population of the black areas that have a thickness of less than about 5 nm to the total population of black areas is the degree of exfoliation.

In the following, the invention will be described in more detail with reference to non-limiting examples. The following examples and tables are presented for purposes of illustration only and are not to be construed in a limiting sense.

EXAMPLES

Example 1

Cationic Mediator of Formula (II), A Liquid Surfactant 654 g of 1-choloroctane (Aldrich) and 360 g of 1-methylimidazal (Aldrich) were added into a 2000 mL tri-neck round-bottom flask. A refluxing/cooling column was installed on the right neck. A thermometer was installed on the left neck. To the middle neck was connected a nitrogen purging tube that delivered the nitrogen gas below the liquid phase. The reactants were mixed with vigorous stirring using magnetic agitation at a temperature between 75 and 80° C. After 8 hours, the solution in the flask turned into a milk-like mixture. After two days, the mixture in the flask turned homogenous again. The reaction was continued for three days. Then, the product was washed with ethyl acetate five times and toluene three times. Thereafter, it was dried in vacuum for three days.

Example 2

Cationic Mediator of Formula (III), A Liquid Surfactant

The procedure of Example 1 was repeated with minor changes. 868 g of 1-cholorohexadecane (Aldrich) and 570 g of 1-methylimidazal (Aldrich) were added in a 2000 mL tri-neck round-bottom flask. The reaction temperature was set to 95 to 100° C. After four hours, the milk-like solution transformed into a homogenous solution. The reaction was continued for three days. The post-treatment was the same as Example 1.

Example 3

Organo-Mica 60 g of the product from Example 1, 40 g of ME-100 (Coop Chemicals, Tokyo, Japan), and 800 g of deionized water were mixed together and shaken for about 16 hours. The organo-treated mica was collected through vacuum-filtration. The treated mica was further washed with isopropenol three times, and was then dried in vacuum. The clay contained 28.77% of organo-matter (i.e., the surfactant), as measured by thermo-gravity analysis (TGA). TGA was carried out on equipment manufactured by TA Instruments and Perkin Elmer, among others.

Example 4

Organo-Mica 80 g of the product from Example 2, 40 g of ME-100 (Coop Chemicals), and 800 g of deionized water were mixed together and shaken for about 16 hours. The organo-treated mica was collected through vacuum-filtration. The treated mica was further washed with isopropanol three times, and was then dried in vacuum. TGA was conducted in the same manner as Example 3, and the result showed that the clay contained 31.71% of organo-matter (i.e., the surfactant).

Figure 2:
FIG. 2 shows the 2-dimensional image of small angle x-ray scattering (SAXS) of ionic liquid surfactant treated mica.

The products were checked using small angle X-ray scattering (SAXS). FIG. 1 and FIG. 2 show the SAXS result of the mica treated with ionic liquid surfactant of formula (III). Based on the scattering intensity profile between $2\theta \approx 1.0$ and $2\theta \approx 10.0$ of scattering angles, particularly the $2\theta \approx 2.2$ peak and the $2\theta \approx 4.2$ triplet peaks, calculation indicates that the mica has been intercalated by the ionic liquid surfactant, and the distances between the mica layers are approximately in the range of 30-40 Å.

Examples 5-11

Bromobutyl Rubber Testing

Seven bromobutyl rubber compounds were prepared according to the formulation shown in Table 1 and Table 2. The bromobutyl rubber is commercially available as Bayer XG124 Bromobutyl, BIIR. In each example, a blend of the ingredients was kneaded by the method listed in Table 3. The physical characteristics of the compositions of Examples 5-11 are shown in Table 4. Testing of the cure characteristics of rubber compounds follow the guidelines of, but were not be restricted to, ASTM-D 2084. A Monsanto Moving Die Rheometer (MDR 2000) was used to measure the cure characteristics of compounded rubbers. Cure capability ($S_{max}$–$S_{min}$) is defined as the difference between the maximum torque and the minimum torque 90% cure time at 165° C. is defined as the time required to achieve 90% cure capability. Measurement of gas permeability was conducted by using 1 mm thick sheets according to ASTM-D1434. The gas permeability index (GPI) value was calculated according to the formula: $GPI = P_c/P_p$ where $P_c$ = permeability of the nanocomposite and $P_p$ = the permeability of the polymer. Shore A Hardness at 23° C., defined as relative resistance of the rubber surface to small deformations, was measured by using a Durometer following ASTM-D2240.

TABLE 1

| | Organo-clay used | Amount of organo-clay (g) | Amount of ionic liquid surfactant in organo-clay (g) | Amount of bromobutyl rubber (g) |
|---|---|---|---|---|
| Example 5 | Example 3 | 11.14 | 2.89 | 43.86 |
| Example 6 | Example 3 | 18.56 | 4.81 | 36.44 |
| Example 7 | Example 4 | 12.5 | 4.25 | 42.49 |
| Example 8 | Example 4 | 20.85 | 7.1 | 34.15 |
| Example 9 (Control 1) | ME-100 | 8.25 | 0 | 46.75 |
| Example 10 (Control 2) | ME-100 | 13.75 | 0 | 41.25 |
| Example 11 (Control 3) | No | 0 | 0 | 55 |

TABLE 2

Final Batch Formulation (for Examples 5 to 11, by parts)

| | |
|---|---|
| Stearic Acid | 0.50 |
| Sulfur | 0.60 |
| Zinc Oxide | 0.45 |
| Altax-MBTS (Accelerator) | 0.75 |

TABLE 3

Mixing Conditions

Mixer: 60 g Brabender   Agitation Speed: 60 rpm

Mater Batch Stage

| Initial Temperature | 70° C. |
|---|---|
| 0 min | charging polymers |
| 0.5 min | charging oil and Carbon Black |
| 3.0 min | drop |

Final Batch Stage

| Initial Temperature | 70° C. |
|---|---|
| 0 sec | charging master stock |
| 2 min | charging curing agent and accelerators |
| 2.5 min | drop |

TABLE 4

Physical properties of the test bromobutyl rubbers.

| | HSA[1] | GPI | CC[2] | CT[3] | M&S[4] | STREM[5] | STRAM[6] |
|---|---|---|---|---|---|---|---|
| Example 5 | 35 | | 2.865 | 13.87 | | | |
| Example 6 | 38 | | 2.987 | 16.43 | | | |
| Example 7 | 50 | 50.2 | 2.846 | 9.22 | 105 | 909 | 844 |
| Example 8 | 53 | 60 | 3.445 | 13.48 | | | |
| Example 9 (Control 1) | 40 | 86.3 | 2.811 | 13.01 | 18.9 | 373 | 772 |
| Example 10 (Control 2) | 42 | 66.4 | 3.161 | 16.74 | | | |
| Example 11 (Control 3) | 33 | 100 | 2.237 | 8.69 | 14 | 324 | 812 |

Note:
[1]HSA means Hardness Shore A at 23° C.
[2]CC means Cure Capability ($S_{max}-S_{min}$) (kg–cm).
[3]CT means 90% Cure time 165° C. (Min.).
[4]M&S means modulus at 23° C. and 35% strain.
[5]STREM means stress at maximum (psi).
[6]STRAM means strain at maximum (%).

Figure 3:
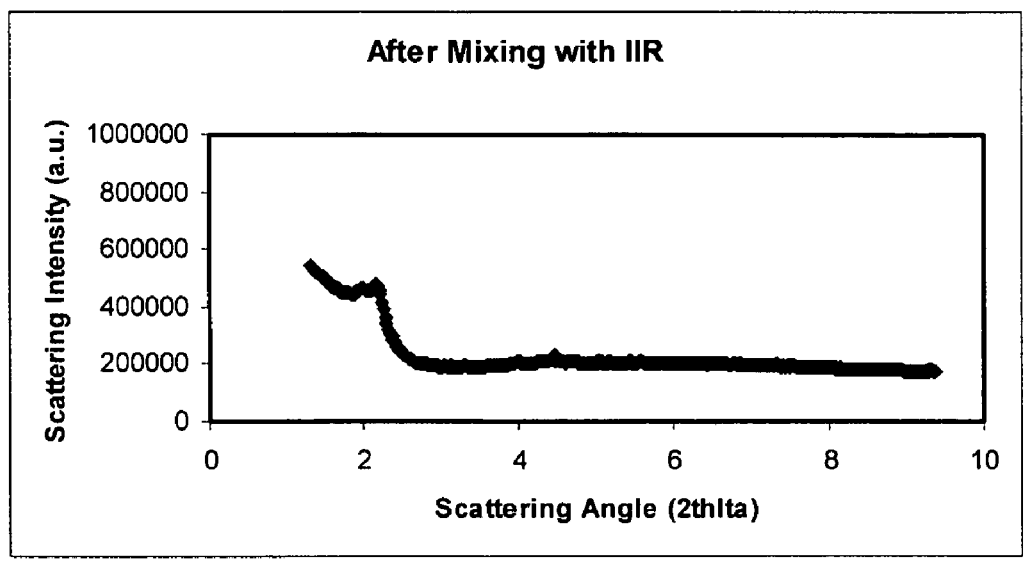
FIG. 3 shows the small angle x-ray scattering (SAXS) of an organo-clay/butyl rubber nanocomposite.
Figure 4:
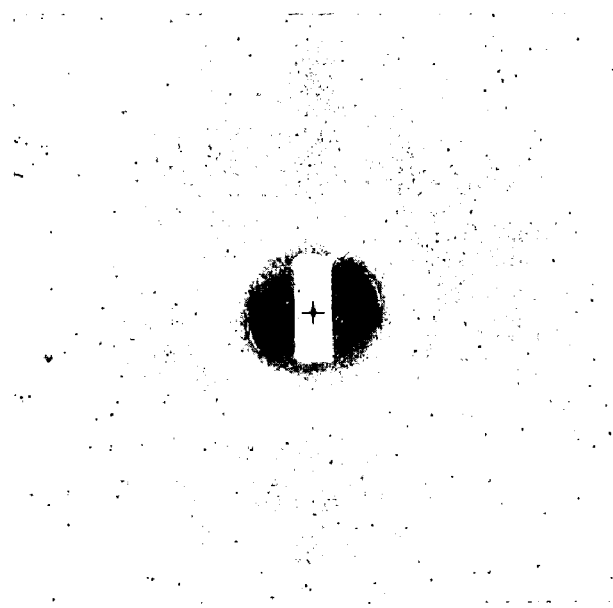
FIG. 4 shows 2-dimensional image of small angle x-ray scattering of the organo-clay/butyl rubber nanocomposite.

The addition of exfoliated clay from example 4 into butyl rubber has significantly lowered gas permeability of the butyl rubber, as compared to control samples. In Examples 5, 6, 7, and 8, various amounts of exfoliated clay from examples 3 or 4 were added to butyl rubber, and the samples have maintained approximately the same cure capability and cure time as those of the control samples. FIGS. 3 and 4 show the SAXS results for Example 8. Comparing to FIGS. 1 and 2, FIGS. 3 and 4 have an increased baseline, disappeared triplet peak around $2\theta \approx 4.2$, and decreased peak values between $2\theta \approx 1.0$ and $2\theta \approx 3.0$. FIGS. 3 and 4 indicate that the clay exists in a less organized form, reflecting that the organo-clay has been further exfoliated in the rubber compound.

Examples 12-14

Natural Rubber Testing

In a manner similar to the procedures of Examples 5-11, natural rubber commercially available as TC10 NR from Firestone Company has been tested with the organo-clay of Example 4. The testing results are tabulated in Table 5.

TABLE 5

Physical properties of the test TC10 NR.

| | Formulation | GPI | CC[2] | CT[3] | M&S[4] | STREM[5] | STRAM[6] |
|---|---|---|---|---|---|---|---|
| Example 12 | Ex. 4 Organo-clay + TC10 NR | 30.7 | 6.47 | 2.54 | 143 | 1949 | 765 |
| Example 13 | ME-100 + TC10 NR (Control) | | 8.19 | 3.43 | 28 | 692 | 679 |
| Example 14 | TC10 NR (Control) | 100 | 5.89 | 2.04 | 19 | 1149 | 862 |

Examples 15-17

Styrene-Butadiene Rubber (SBR) Testing

In a manner similar to the procedures of Examples 5-11, solution SBR commercially available as HX263 from Firestone Company has been tested with the organo-clay of Example 4. The testing results are tabulated in Table 6.

TABLE 6

Physical properties of the test HX263 SBR.

| | Formulation | GPI | $CC^2$ | $CT^3$ | $M\&S^4$ | $STREM^5$ | $STRAM^6$ |
|---|---|---|---|---|---|---|---|
| Example 15 | Ex. 4 Organo-clay + HX263 | 38.3 | 8.0 | 7.62 | 159 | 1155 | 619 |
| Example 16 | ME-100 + HX263 (Control) | | 11.07 | 16.75 | 40 | 335 | 242 |
| Example 17 | HX263 (Control) | 100 | 8.58 | 16.86 | 28 | 176 | 200 |

Examples 18-20

Hcis-Butyl Rubber Testing

In a manner similar to the procedures of Examples 5-11, Hcis-BR commercially available as Diene 600 from Firestone Company has been tested with the organo-clay of Example 4. The testing results are tabulated in Table 7.

TABLE 7

Physical properties of the test Diene 600 Hcis-BR.

| | Formulation | GPI | $CC^2$ | $CT^3$ | $M\&S^4$ | $STREM^5$ | $STRAM^6$ |
|---|---|---|---|---|---|---|---|
| Example 18 | Ex. 4 Organo-clay + Diene 600 | 30.7 | 8.6 | 4.56 | 121 | 498 | 548 |
| Example 19 | ME-100 + Diene 600 (Control) | | 10.73 | 17.49 | 39 | 186 | 251 |
| Example 20 | Diene 600 (Control) | 100 | 8.78 | 16.21 | 26 | 167 | 185 |

Examples 21-23

Solution Butyl Rubber Testing

In a manner similar to the procedures of Examples 5-11, solution butyl rubber commercially available as Diene 40NF from Firestone Company has been tested with the organo-clay of Example 4. The testing results are tabulated in Table 8.

TABLE 8

Physical properties of the test Diene 40NF Soln BR.

| | Formulation | GPI | $CC^2$ | $CT^3$ | $M\&S^4$ | $STREM^5$ | $STRAM^6$ |
|---|---|---|---|---|---|---|---|
| Example 21 | Ex. 4 Organo-clay + Diene 40NF | 34.1 | 7.95 | 5.76 | 136 | 555 | 523 |
| Example 22 | ME-100 + Diene 40NF (Control) | | 12.68 | 17.50 | 42 | 255 | 177 |
| Example 23 | Diene 40NF (Control) | 100 | 10.03 | 18.36 | 27 | 156 | 162 |

The results of Examples 5-23 show that under 15 wt % of loading, the tensile strengths of the test compounds were all better than that of the controls. Particularly, SBR shows the strongest interactions with the organo-mica, and it displays an 800% improvement in the tensile strength. Other benefits of using the treated ME100 include, for example, improved gas permeability and cure properties.

The rubber compositions of the present invention can be formulated into any component or article for which butyl rubber is typically utilized. Typical articles for which the butyl rubber compositions can be used include, but are not limited to, inner-tubes and tire inner liners, sidewall, thread rubber, hose, containers, air cushions, pneumatic sprays, air bags, tire-curing bladders, air bellows, accumulator bags, pharmaceutical closures, high temperature hoses and conveyor belts, damping mounts for engines and the like.

Example 24

The Synthesis of 1-benyzl-3-hexadecanyl Imidazolium Chloride with Formula (IV)

103 g of 1-benzylimidazole (Aldrich) and 170 g of 1-chlorohexadecane were added into a 2000 ml three-neck round-bottom flask. A refluxing/cooling condenser was set on the left neck. A thermometer was set on the right neck. A rubber stopper was set on the middle neck. Nitrogen gas was delivered into the liquid phase through a needle inserted into the rubber stopper in the middle neck. The reactants were mixed with vigorous stirring using a magnetic stirrer. After heating the contents of the flask to about 70-80° C., 1-benzylimidazole dissolved into the 1-chlorohexadecane. The temperature of the contents of the flask was maintained between 70 and 80° C. The solution in the flask turned into a red brown solution. The reaction was continued for 72 hours. Then, the product was cooled and a white product precipitated out of the solution. The product was washed with ethyl acetate. The washing step was repeated five times. After that, the product was dried in vacuum for seven hours at about 50° C.

Example 25

Preparation of Organo-Mica 80 g of the product from Example 24, 40 g of ME100 (Coop Chemical Co.) and 800 g of deionized water were mixed together in a vessel and tumbled for 16 hours. The solution was filtered and the treated mica was collected. Then, it was dried in vacuum. TGA analysis showed that the treated mica contained 50.31% of the inorganic residue.

Example 26

Preparation of Organo-Mica 80 g of the product from Example 2, 40 g of ME100 (Coop Chemical Co.) and 800 g of deionized water were mixed together in a vessel and tumbled for 16 hours. The solution was filtered and the treated mica was collected. Then, it was dried in a vacuum. TGA analysis showed that the treated mica contained 48.57% of the inorganic residue.

Examples 27, 28, 29, and 30

Rubber Mixing

Examples 27, 28, 29, and 30 were prepared according to the formulation and the mixing conditions shown in Tables 9 and 10.

TABLE 9

Rubber Formulations

| | Ex. 27 | Ex. 28 | Ex. 29 | Ex. 30 |
|---|---|---|---|---|
| Treated mica | Ex. 25 | Ex. 26 | Me100 | None |
| Amount of the treated mica (g) | 12.99 | 13.33 | 7.5 | — |
| Amount of Br-IIR (g) | 37.01 | 36.67 | 42.5 | 50 |
| Remill stock (g) | 46.81 | 46.84 | 46.37 | 45.79 |
| Cure Packages (g) | | | | |
| Accelerator (DM)* | 0.69 | 0.69 | 0.79 | 0.92 |
| Sulfur | 1.04 | 1.03 | 1.18 | 1.37 |
| Stearic Acid | 0.62 | 0.62 | 0.71 | 0.82 |
| Zinc Oxide | 0.83 | 0.82 | 0.95 | 1.10 |

*Altx-MBTS

TABLE 10 mixing conditions

| Mixer 60 g Brabender Master batch stage | Rotation Speed 60 rpm |
|---|---|
| Initial temperature | 70° C. |
| 0.0 min | charging polymers |
| 0.5 min | charging treated mica |
| 3.0 min | drop |
| Remill stage | |
| Initial temperature | 70° C. |
| 0.0 min | charging master stocks |
| 3.0 min | drop |
| Final Batch | |
| Initial temperature | 70° C. |
| 0.0 min | charging remill stocks |
| 0.5 min | charging cure packages |
| 2.0 min | drop |

After sheeting, rubber compounds were cured for 30 min at 165° C.

Example 31

Rubber Testing

In this example, the gas permeability was measured at 100° C. by GTR-30ABS (GTR TEK Co LTD) and Fleon gas (F-134a, 1,1,1,2-tertrafluoroethane) was used as test gas.

Figure 5:
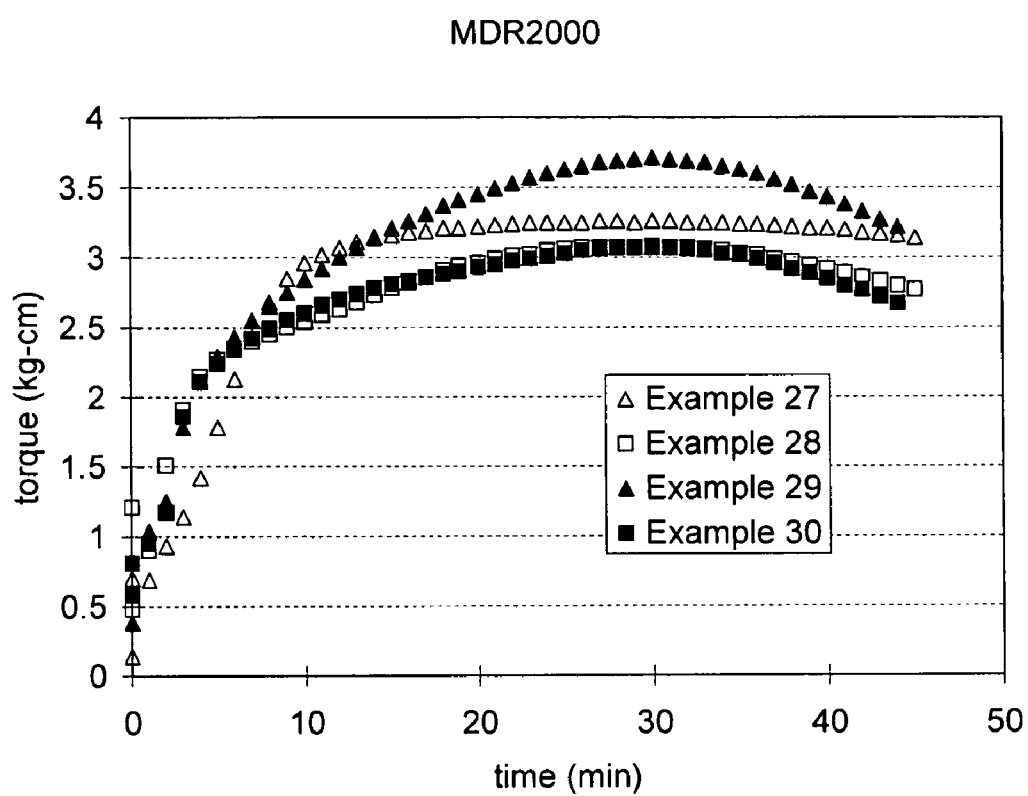
FIG. 5 shows the changing of torque as a function of cure time for an organo-clay treated rubber.

Experimental results shown in Table 11 and FIG. 5 indicate that Example 27 test rubber compounds have some improved cure properties such as presence of vulcanization plateau, and gas permeability index.

TABLE 11

Physical properties of test rubbers

| | Ex. 27 | Ex. 28 | Ex. 29 | Ex. 30 |
|---|---|---|---|---|
| Cure Capability ($S_{max}-S_{min}$) (kg-cm) | 2.63 | 2.35 | 2.68 | 2.14 |
| $T_{0.1}$ (10% cure time; min) | 1.86 | 1.13 | 2.06 | 1.96 |
| $T_{0.9}$ (90% cure time, min) | 10.59 | 16.40 | 19.88 | 16.98 |
| Gas permeability index | 40 | 42 | 78 | 100 |

The technology developed here can be used to develop rubber compounds for tire inner liners, sidewall, tread rubber, hose and containers. The technology can provide good cure systems and low gas permeability materials.

The present invention has been described with reference to certain preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A rubber tire comprising:
   a nano-composite comprising
   (a) a cationic mediator comprised of a hydrophobic unit and a heterocyclic cationic unit, and
   (b) a clay, wherein said clay is exfoliated or intercalated by said cationic mediator;
   wherein the heterocyclic cationic unit includes an imidazole;
   wherein the cationic mediator comprises one of the formulas shown below:

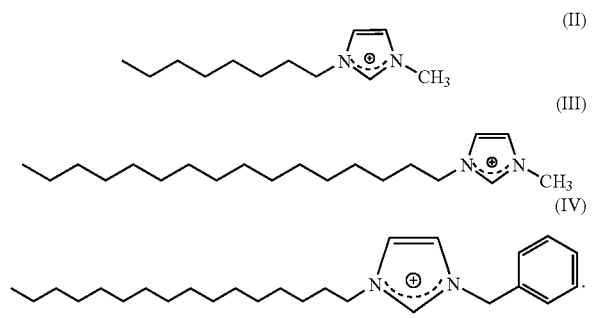

2. The product of claim 1, in which the clay is selected from the group consisting of mica; fluoro-mica; synthetic mica; montmorillonite, Bentonite, sodium montmorillonite, magnesium montmorillonite, calcium montmorillonite, beidellite, nontronite, hectorite, sodium hectorite, saponite, synthetic saponite, sauconite; pyrophyllite; glauconites; vermiculites; polygorskines; sepiolites; allophanes; imogolites; talc; illites; glauconite; volkonskoite; sobockite; stevensite; svinfordite; magadiite; kenyaite; kaolinite; dickite; nacrite; anauxite; ledikite; montronite; halloysite; metahalloysite; sericite; allophone; chrysotile; antigorite; attapulgite; sepiolite; palygorskite; Kibushi clay; gairome clay; hisingerite; chlorite; and mixtures thereof.

3. The rubber tire of claim 1, in which the clay comprises mica or synthetic mica.

4. The rubber tire of claim 1, further comprising a counter ion selected from the group consisting of $Cl^-$, $Br^-$, $F^-$, $I^-$, $O^{2-}$, $S^{2-}$, $Se^{2-}$, $Te^{2-}$, $N^{3-}$, $As^{3-}$, $BF_4^-$, $PF_6^-$, $CO_3^{2-}$, $HCO_3^-$, $SO_4^{2-}$, $CF_3SO_3^-$, $SO_3^{2-}$, $S_2O_3^{2-}$, $HSO_4^-$, $H_2PO_4^-$, $HPO_4^{2-}$, $PO_4^{3-}$, $NO_2^-$, $NO_3^-$, $C_2O_4^-$, $C_2H_3O_2^-$, $OH^-$, $O_2^{2-}$, $N_3^-$, $CrO_4^{2-}$, $Cr_2O_7^{2-}$, $BO_3^{3-}$, $MnO_4^-$, $AsO_4^{3-}$, $SCN^-$, $CN^-$, $CNO^-$, $ClO^-$, $ClO_2^-$, $ClO_3^-$, $ClO_4^-$, $BrO^-$, $BrO_2^-$, $BrO_3^-$, $BrO_4^-$, $IO^-$, $IO_2^-$, $IO_3^-$, and $IO_4^-$.

5. A rubber tire comprising:
   a composition comprising (a) a cationic mediator comprised of a hydrophobic unit and a heterocyclic cationic unit, (b) a clay, and (c) a carbon-chain or a heterochain polymer, wherein said clay is exfoliated or intercalated by said heterocyclic cationic unit and said polymer;
   wherein the heterocyclic cationic unit includes an imidazole;
   in which the cationic mediator comprises one of the formulas shown below:

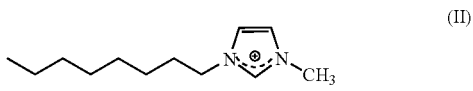

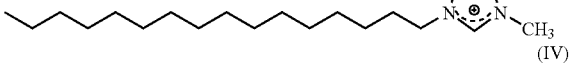

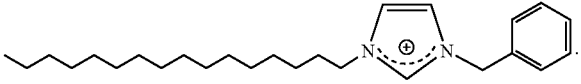

6. The rubber tire of claim 5, wherein the carbon-chain polymer is selected from the group consisting of polychloroprene, polyethylene, isobutene-isoprene rubber, halogenated butyl rubber, CuR, BrIIR, neoprene rubber, nitrile rubber, 1,2-polybutadiene, polyallene, polybutadiene, polyisobutylene, polyisoprene, 3,4-polyisoprene, poly(methyl acrylate), poly(methyl vinyl ketone), ethylene-propylene elastomer, polypropylene, styrene-butadiene rubber, poly(methyl methacrylate), acrylonitrile-butadiene-styrene terpolymer, poly(vinyl chloride), poly(vinylidene chloride), poly(vinyl pyridine), poly(vinyl pyrrolidone), poly(acrylic anhydride), polyacrylonitrile, styrene-acrylonitrile copolymer, ethylene-vinyl acetate copolymer, and combinations thereof.

7. A method of exfoliating a clay and incorporating it in a rubber tire, including mixing into the clay a sufficient amount of a cationic mediator comprised of a hydrophobic unit and a heterocyclic cationic unit
   wherein the cationic mediator comprises one of the formulas shown below:

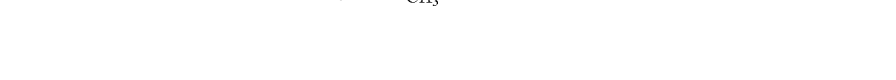

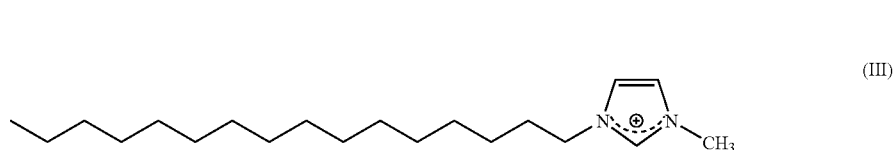

-continued

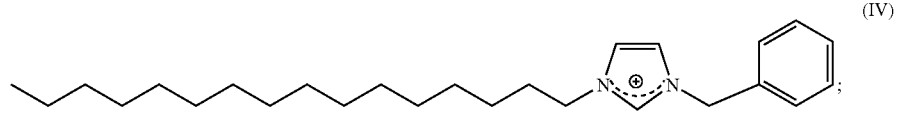

and incorporating the clay into a rubber tire.

8. A method to improve rubber properties in a tire product including at least one of gas permeability, cure properties, and mechanical properties, comprising mixing a clay with sufficient amount of a cationic mediator comprised of a hydrophobic unit and a heterocyclic cationic unit as defined in claim 1; exfoliating the clay by the cationic mediator; and mixing the exfoliated clay into a rubber tire;

wherein the heterocyclic cationic unit includes an imidazole;

wherein the cationic mediator comprises one of the formulas shown below:

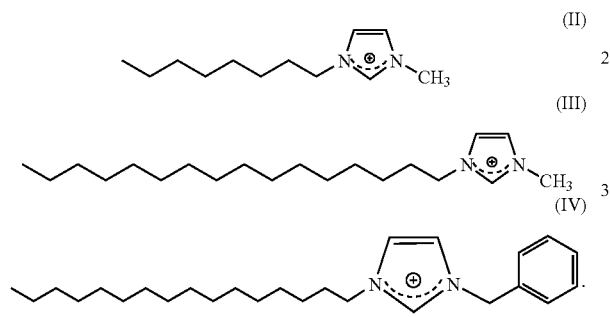

9. A rubber tire comprising:
a nano-composite composition comprising (a) a layered material comprising cations, and (b) a cationic mediator comprising a hydrophobic unit and a hetercyclic unit, wherein at least one of the cationic mediators comprises at least partial exchange with at least one of the cations;

wherein the heterocyclic cationic unit includes an imidazole;

wherein the cationic mediator comprises one of the formulas shown below:

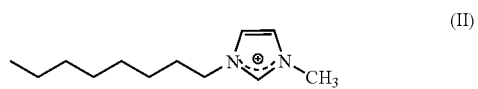

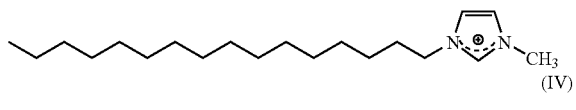

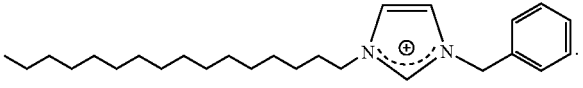

10. The tire product of claim 5, wherein the carbon chain polymer is butyl rubber.

11. The rubber tire of claim 1, in which the clay is selected from the group consisting of smectites, phyllosilicates, and serpentine clays.

* * * * *